United States Patent
Li

(10) Patent No.: US 11,315,070 B2
(45) Date of Patent: Apr. 26, 2022

(54) METHOD AND APPARATUS FOR STORING INFORMATION

(71) Applicants: Beijing Jingdong Shangke Information Technology Co., Ltd., Beijing (CN); Beijing Jingdong Century Trading Co., Ltd., Beijing (CN)

(72) Inventor: Hongxu Li, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 28 days.

(21) Appl. No.: 16/961,523

(22) PCT Filed: Jan. 29, 2019

(86) PCT No.: PCT/CN2019/073653
§ 371 (c)(1),
(2) Date: Jul. 10, 2020

(87) PCT Pub. No.: WO2019/154178
PCT Pub. Date: Aug. 15, 2019

(65) Prior Publication Data
US 2021/0065110 A1 Mar. 4, 2021

(30) Foreign Application Priority Data
Feb. 11, 2018 (CN) .......................... 201810140708.5

(51) Int. Cl.
*G06Q 10/08* (2012.01)
*G06F 16/28* (2019.01)
(Continued)

(52) U.S. Cl.
CPC .......... *G06Q 10/0838* (2013.01); *G06F 9/54* (2013.01); *G06F 16/284* (2019.01);
(Continued)

(58) Field of Classification Search
CPC ............ G06Q 10/0838; G06Q 10/0833; G06F 16/284
See application file for complete search history.

(56) References Cited

U.S. PATENT DOCUMENTS

2017/0262862 A1* 9/2017 Aljawhari ......... G06F 16/90335
2017/0300905 A1 10/2017 Withrow et al.
(Continued)

FOREIGN PATENT DOCUMENTS

| CN | 103559434 A | 2/2014 |
|---|---|---|
| CN | 105427117 A | 3/2016 |

(Continued)

OTHER PUBLICATIONS

International Search Report and Written Opinion for International Application No. PCT/CN2019/073653, dated May 7, 2019, 6 pages.
(Continued)

*Primary Examiner* — A. Hunter Wilder
(74) *Attorney, Agent, or Firm* — RatnerPrestia

(57) ABSTRACT

A method and apparatus for storing information. The method comprises: generating a traceability code of an article, and associating the traceability code of the article with the article (201); collecting circulation information of the article (202); determining a form data item corresponding to the circulation information of the article (203); and according to the traceability code of the article, and a correlation between the form data item corresponding to the circulation information of the article and the circulation information of the article, storing the traceability code of the article, the form data item (Continued)

corresponding to the circulation information of the article and the circulation information of the article (204).

12 Claims, 3 Drawing Sheets

(51) Int. Cl.

| | | |
|---|---|---|
| *G06F 9/54* | (2006.01) | |
| *G06K 7/10* | (2006.01) | |
| *G06Q 30/00* | (2012.01) | |
| *G06Q 30/02* | (2012.01) | |
| *G06Q 50/04* | (2012.01) | |
| *H04L 9/32* | (2006.01) | |

(52) U.S. Cl.
CPC ....... *G06K 7/10861* (2013.01); *G06Q 10/087* (2013.01); *G06Q 10/0833* (2013.01); *G06Q 30/0185* (2013.01); *G06Q 30/0201* (2013.01); *G06Q 50/04* (2013.01); *H04L 9/3236* (2013.01); *G06K 2007/10504* (2013.01)

(56) References Cited

U.S. PATENT DOCUMENTS

| | | | |
|---|---|---|---|
| 2018/0349893 A1* | 12/2018 | Tsai | ........................ H04L 67/104 |
| 2019/0147397 A1* | 5/2019 | Hodges | .............. G06Q 10/0833 |
| | | | 705/333 |

FOREIGN PATENT DOCUMENTS

| | | |
|---|---|---|
| CN | 108779737 A | 5/2017 |
| CN | 107274136 A | 10/2017 |
| CN | 107316239 A | 11/2017 |
| CN | 108985784 A | 12/2018 |
| WO | 2017196655 | 11/2017 |

OTHER PUBLICATIONS

Indian Examination Report for Indian Application No. 202017029557, dated Jul. 1, 2021 with translation, 6 pages.
Extended European Search Report for European Application No. 19 751 150.4, dated Oct. 6, 2021, 8 pages.

\* cited by examiner

METHOD AND APPARATUS FOR STORING INFORMATION

CROSS-REFERENCE TO RELATED APPLICATIONS

This patent application is a U.S. national stage application of international Application No. PCT/CN2019/073653, filed on Jan. 29, 2019, which claims priority to Chinese Patent Application No. 201810140708.5, filed on Feb. 11, 2018 by the applicants BEIJING JINGDONG SHANGKE INFORMATION TECHNOLOGY CO., LTD., and BEIJING JINGDONG CENTURY TRADING CO., LTD., and entitled "Method and apparatus for storing information," the entire contents of each of which are herein incorporated by their entities.

TECHNICAL FIELD

Embodiments of the present disclosure relate to the field of computer technology, in particular to the field of the Internet technology, and more particularly to a method and apparatus for storing information.

BACKGROUND

With the popularity of the Internet, the advantages of online shopping are more prominent. Various types of shopping websites are emerging, and the scale of users of shopping items on the shopping websites is increasing. However, as the counterfeit and inferior goods are constantly flowed in, the case that the goods bought on the shopping website by the user are counterfeit and inferior occurs frequently. Therefore, how to avoid the inflow of counterfeit goods has become an urgent problem to be solved.

SUMMARY

Embodiments of the present disclosure propose a method and apparatus for storing information.

In a first aspect, an embodiment of the present disclosure provides a method for storing information, including: generating a source tracing code of an item, and associating the source tracing code of the item with the item; collecting flow information of the item; determining a form data item corresponding to the flow information of the item; and storing the source tracing code of the item, the form data item corresponding to the flow information of the item, and the flow information of the item according to a corresponding relationship between the source tracing code of the item, the form data item corresponding to the flow information of the item, and the flow information of the item.

In some embodiments, the generating a source tracing code of an item includes: acquiring a producer identification code of a producer of the item; generating an item identification code of the item; and combining the producer identification code of the producer of the item with the item identification code of the item to obtain the source tracing code of the item.

In some embodiments, the flow information includes at least one of: production information of the item, purchasing information of the item, producer shipment information of the item, warehousing information of the item, order placing information of the item, packing information of the item, logistics information of the item, or sign-in information of the item.

In some embodiments, the collecting flow information of the item includes: collecting the production information of the item by electronic data interchange; collecting the producer shipment information of the item by inter-process communication; collecting the purchasing information, the warehousing information, the order placing information, the packing information and the sign-in information of the item by using a message queue message subscription method; and collecting the logistics information of the item by utilizing an application programming interface docking mode.

In some embodiments, the storing the source tracing code of the item, the form data item corresponding to the flow information of the item, and the flow information of the item according to a corresponding relationship between the source tracing code of the item, the form data item corresponding to the flow information of the item, and the flow information of the item includes: storing the source tracing code of the item, the form data item corresponding to the flow information of the item, and the flow information of the item in a relational database according to the corresponding relationship between the source tracing code of the item, the form data item corresponding to the flow information of the item, and the flow information of the item; performing a hash operation on the flow information of the item to obtain a hash value of the flow information of the item; and storing the hash value of the flow information of the item in a blockchain.

In some embodiments, the method further includes: receiving an acquisition request for the flow information of the item sent by a terminal device, wherein the terminal device transmits the acquisition request by scanning a label carrying the source tracing code of the item; finding the form data item corresponding to the flow information of the item and the flow information of the item from the relational database; finding a blockchain transaction identifier corresponding to the hash value of the flow information of the item from the blockchain; and sending the form data item corresponding to the flow information of the item, the flow information of the item, and the blockchain transaction identifier corresponding to the hash value of the flow information of the item to the terminal device, so that the terminal device displays the form data item corresponding to the flow information of the item, the flow information of the item, and the blockchain transaction identifier corresponding to the hash value of the flow information of the item.

In a second aspect, an embodiment of the present disclosure provides an apparatus for storing information, including: a generating unit configured to generate a source tracing code of an item, and associate the source tracing code of the item with the item; a collecting unit configured to collect flow information of the item; a determining unit configured to determine a form data item corresponding to the flow information of the item; and a storage unit configured to store the source tracing code of the item, the form data item corresponding to the flow information of the item, and the flow information of the item according to a corresponding relationship between the source tracing code of the item, the form data item corresponding to the flow information of the item, and the flow information of the item.

In some embodiments, the generating unit includes an acquiring module configured to acquire a producer identification code of a producer of the item; a generating module configured to generate an item identification code of the item; and a combination module configured to combine the producer identification code of the producer of the item with the item identification code of the item to obtain the source tracing code of the item.

In some embodiments, the flow information includes at least one of: production information of the item, purchasing information of an item, producer shipment information of the item, warehousing information of the item, order placing information of the item, packing information of the item, logistics information of an item, or sign-in information of the item.

In some embodiments, the collecting unit includes: a first collecting module configured to collect the production information of the item by electronic data interchange; a second acquiring module configured to collect the producer shipping information of the item by inter-process communication; a third collecting module configured to collect the purchasing information, warehousing information, order placing information, packaging information, and sign-in information of the item by using a message queue message subscription; and a fourth collecting module configured to collect the logistics information of the item using an application programming interface docking mode.

In some embodiments, the storage unit includes a first storage module configured to store the source tracing code of the item, the form data item corresponding to the flow information of the item, and the flow information of the item in a relational database according to the corresponding relationship between the source tracing code of the item, the form data item corresponding to the flow information of the item, and the flow information of the item; a hash operation module configured to perform a hash operation on the flow information of the item to obtain a hash value of the flow information of the item; and a second storage module configured to store the hash value of the flow information of the item in the blockchain.

In some embodiments, the apparatus further includes a receiving unit configured to receive an acquisition request for flow information of the item sent by a terminal device, wherein the terminal device transmits the acquisition request by scanning a label carrying a source tracing code of the item; a first searching unit configured to find the form data item corresponding to the flow information of the item and the flow information of the item from the relational database; a second searching unit configured to find a blockchain transaction identifier corresponding to the hash value of the flow information of the item from the blockchain; a sending unit configured to send the form data item corresponding to the flow information of the item, the flow information of the item, and the blockchain transaction identifier corresponding to the hash value of the flow information of the item to the terminal device, so that the terminal device displays the form data item corresponding to the flow information of the item, the flow information of the item, and the blockchain transaction identifier corresponding to the hash value of the flow information of the item.

In a third aspect, an embodiment of the present disclosure provides an electronic device including: one or more processors; and a storage apparatus for storing one or more programs; wherein the one or more programs, when executed by the one or more processors, cause the one or more processors to implement the method of any implementation in the first aspect.

The method and apparatus for storing information provided by embodiments of the present disclosure, a source tracing code of an item is generated first so as to associate the source tracing code of the item with the item; flow information of the item is collected; then a form data item corresponding to the flow information of the item is determined; and finally, the source tracing code of the item, the form data item corresponding to the flow information of the item, and the flow information of the item are stored according to the corresponding relationship between the source tracing code of the item, the form data item corresponding to the flow information of the item, and the flow information of the item. The flow information of the item is stored so that the user may monitor the flow process of the item by inquiring the flow information of the stored item, thereby helping to avoid the inflow of counterfeit and inferior items during the flow process of the item.

BRIEF DESCRIPTION OF THE DRAWINGS

Other features, objects, and advantages of present disclosure will become more apparent by reading the detailed description of non-limiting embodiments made with reference to the following drawings.

DETAILED DESCRIPTION

Figure 1:
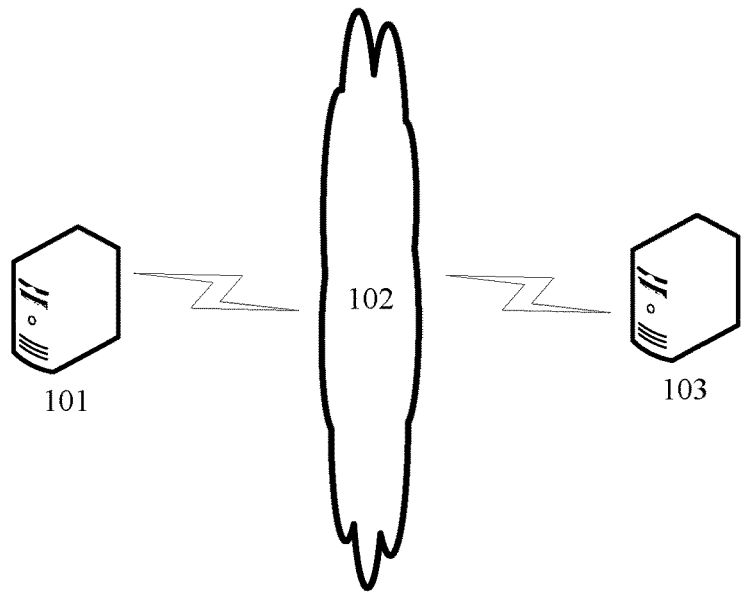
FIG. 1 is an example system architecture diagram in which embodiments of the present disclosure may be applied.

The present disclosure is described in further detail below with reference to accompanying drawings and embodiments. It is to be understood that the specific embodiments described herein are merely illustrative of the related disclosure and are not restrictive of the disclosure. It is also to be noted that, for ease of description, only parts related to the disclosure are shown in the drawings.

It should be noted that embodiments in present disclosure and the features in the embodiments may be combined with each other without conflict. In the following, present disclosure will be described in detail with reference to the accompanying drawings and embodiments.

FIG. 1 illustrates an example system architecture 100 in which a method for storing information or an apparatus for storing information of embodiments of the present disclosure may be applied.

As shown in FIG. 1, the system architecture 100 may include a server 101, a network 102, and a data storage server 103. The network 102 serves as a medium for providing a communication link between the server 101 and the data storage server 103. Network 102 may include various types of connections, such as wired, wireless communication links, or fiber optic cables, or the like.

The data storage server 103 may interact with the server 101 through the network 102 to receive or send messages or the like. The data storage server 103 may be a server for storing a source tracing code of an item, a form data item corresponding to flow information of the item, and flow information of the item. The server 101 may provide various services, for example, the server 101 may generate a source tracing code of an item and associate the source tracing code of the object with the item; collect flow information of the item; then determine a form data item corresponding to the flow information of the item; and finally, send the source tracing code of the item, the form data item corresponding to the flow information of the item, and the flow information of the item to the data storage server 103 for storage according to the corresponding relationship between the source tracing code of the item, the form data item corresponding to the flow information of the item, and the flow information of the item.

It should be noted that the method for storing information provided by embodiments of the present disclosure is generally performed by the server 101, and accordingly, the apparatus for storing information is generally provided in the server 101.

It should be understood that the number of servers, networks and data storage servers in FIG. 1 is merely illustrative. There may be any number of servers, networks, and data storage servers, as required by the implementation. In the case where the server 101 may locally store the source tracing code of the item, the form data item corresponding to the flow information of the item, and the flow information of the item, the system architecture 100 may not provide the data storage server 103.

Figure 2:
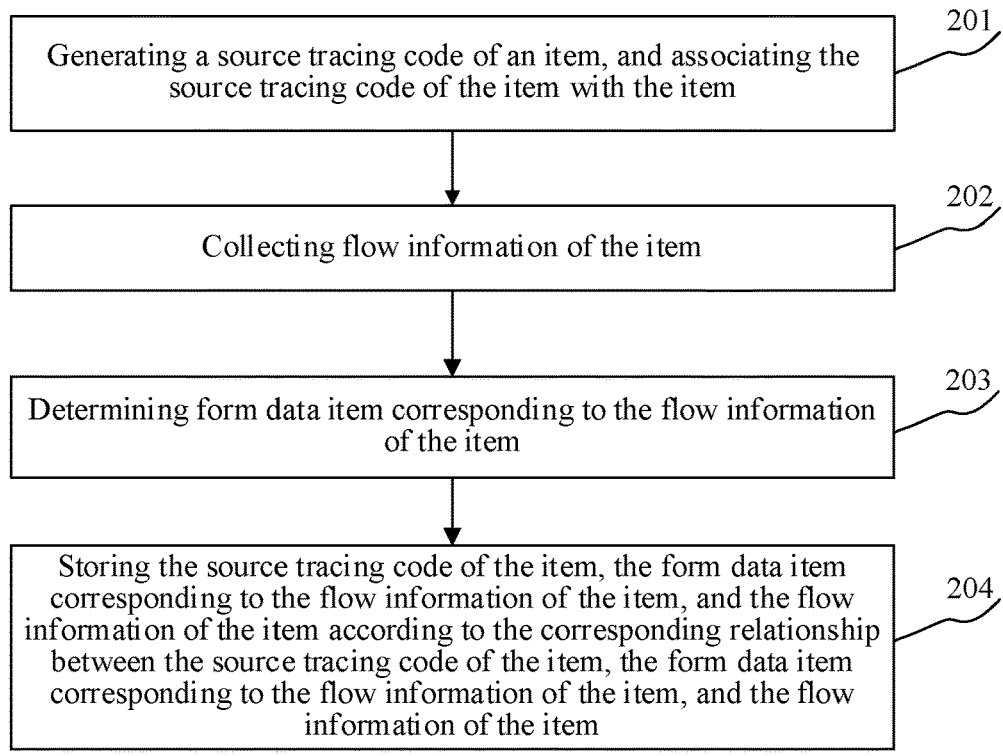
FIG. 2 is a flowchart of a method for storing information according to an embodiment of present disclosure.

With continuing reference to FIG. 2, a flow 200 of a method for storing information according to an embodiment of the present disclosure is shown. The method for storing information includes the following steps.

Step 201, generating a source tracing code of an item, and associating the source tracing code of the item with the item.

In the present embodiment, an electronic device (such as the server 101 shown in FIG. 1) on which a method for storing information runs may generate a source tracing code of an item and associate the source tracing code of the item with the item. The electronic device may be a server of the seller of the item. The items may be various items sold through a shopping website. The source tracing code, also known as the anti-counterfeiting source tracing code, is an information tracing identifier that can be used to uniquely identify an item or a batch of items. Here, a label (for example, a two-dimensional code, a bar code, a text, a picture, or the like) carrying a source tracing code of an item can be printed and attached to the item or a package of the item. At the same time, since there is a correlation between the source tracing code of the item and the item, the item will contain the source tracing code of the item in any information generated in the flow process.

In some alternative implementations of the present embodiment, the electronic device may generate the source tracing code of the item by the following steps.

First, a producer identification code of a producer of an item is acquired.

The producer identification, also known as the producer number, is generally composed of letters, numbers, symbols, and the like, and may be used to uniquely identify a producer.

Then, an item identification code of the item is generated.

The item identification code is generally composed of letters, numbers, symbols, and the like, and can be used to uniquely identify one item or a batch of items.

Finally, the producer identification code of the producer of the item and the item identification code of the item are combined to obtain a source tracing code of the item.

Here, the producer identification code of the producer of the item and the item identification code of the item may be combined in any manner. For example, the producer identification code of the producer of the item is placed in front, and the item identification code of the item is placed in rear to combine the source tracing code of the item.

In some alternative implementations of the present embodiment, the electronic device may alternatively generate an item identification code for the item, and use the item identification code as the source tracing code of the item directly.

Step 202, collecting flow information of the item.

In this embodiment, the electronic device may collect the flow information of the item. The flow information of the item may include, but is not limited to, at least one of: production information of the item, purchasing information of the item, producer shipment information of the item, warehousing information of the item, order placing information of the item, packing information of the item, logistics information of the item, or sign-in information of the item. Moreover, since there is an association between the source tracing code of the item and the item, any piece of the flow information of the item contains the source tracing code of the item.

In some alternative implementations of the present embodiment, the electronic device may collect the flow information of the item by the following way.

1. Collecting production information of the item by electronic data interchange.

Here, the production information of the item may be information generated during production of the item by the producer, which is generally stored in a server of the producer, whose information format is generally different from the information format in the electronic device, and therefore, the production information of the item may be first converted into a standard format by means of EDI (Electronic Data Interchange) and then transmitted to the electronic device. EDI is an international standard for use by the International Organization for Standardization (ISO), and refers to an electronic transmission method from a computer to a computer for a business or administrative transaction, by forming a structured transaction or message format according to a generally accepted standard. The EDI is also a commercial language that is recognized by a computer.

2. Collecting producer shipment information of the item by utilizing an inter-process communication mode.

Here, the producer shipment information of the item may be information generated during the course from shipment by the producer to receipt of the item by the seller, which is usually stored in another server of the seller, so that a process or thread may be created between the electronic device and the other server of the seller in an IPC (Inter-Process Communication) manner, through which the producer shipment information of the item in the other server of the seller may be quickly transmitted to the electronic device. Here, IPC refers to some technique or method of transferring data or signals between at least two processes or threads. A process is the smallest unit (strictly being a thread) in which a computer system allocates resources. Each process has a part of its own independent system resources, which are isolated from each other. To enable different processes to access resources and coordinate with each other, inter-process communications are available.

3. Collecting purchasing information, warehousing information, order placing information, packing information and sign-in information of the item by a message queue message subscription mode.

Here, the purchasing information of the item is information generated in the course of the seller placing the purchase order on the item, the warehousing information of the item is information generated in the course from the seller receiving the item to the item entering warehouse, the order placing information of the item is information generated in the course of the purchaser placing the order on the item, the packing information of the item is information generated in the course of the seller packing the item, and the sign-in information of the item is information generated in the course of the purchaser signing for the item. Therefore, the purchasing information, the warehousing information, the order placing information, the packing information, and the sign-in information of the item may be stored in the message queue by using an MQ (Message queue) message subscription method, and the purchasing information, the warehousing information, the order placing information, the packing information, and the sign-in information of the item may be transmitted to the electronic device through the message queue. The MQ is a container for storing a message during transmission of the message.

4. Collecting logistics information of the item by means of Application Programming Interface docking.

Here, the logistics information of the item may be information generated during the logistics transportation of the item, and the logistics information of the item is generally stored in the logistics transportation application. Therefore, the API (Application Programming Interface) of the logistics transportation application may be docked in an API manner to realize the acquisition of the logistics information of the item from the logistics transportation application. APIs are predefined functions to provide the capability of applications and developers to access a set of routines based on certain software or hardware without having to access the source code or to understand the details of the internal operating mechanism.

Step 203: determining form data item corresponding to the flow information of the item.

In the present embodiment, a person skilled in the art may pre-set a form data item corresponding to various flow information of an item (for example, a form data item corresponding to production information of an item, a form data item corresponding to purchasing information of an item, a form data item corresponding to warehousing information of an item, or the like), and pre-store the form data item in an electronic device, and the electronic device may determine the form data item corresponding to the flow information of the item according to the type of the flow information of the currently collected item.

Step 204: storing the source tracing code of the item, the form data item corresponding to the flow information of the item, and the flow information of the item according to the corresponding relationship between the source tracing code of the item, the form data item corresponding to the flow information of the item, and the flow information of the item.

In the present embodiment, the electronic device may first determine the corresponding relationship between the source tracing code of the item, the form data item corresponding to the flow information of the item, and the flow information of the item, for example, there is a corresponding relationship between the source tracing code of the item, the form data item corresponding to the production information of the item, and the production information of the item, and there is a corresponding relationship between the source tracing code of the item, the form data item corresponding to the purchasing information of the item, and the purchasing information of the item; Then, the source tracing code of the item, the form data item corresponding to the flow information of the item, and the flow information of the item are stored according to the corresponding relationship between the source tracing code of the item, the form data item corresponding to the flow information of the item, and the flow information of the item. For example, the source tracing code of the item, the form data item corresponding to the production information of the item, and the production information of the item which have a corresponding relationship therein are stored in the same row of the data table, and the source tracing code of the item, the form data item corresponding to the purchasing information of the item, and the purchasing information of the item which have a corresponding relationship therein are stored in the next row.

The method for storing information provided by the embodiment of the present disclosure, a source tracing code of an item is generated first so as to associate the source tracing code of the item with the item; flow information of the item is collected; then a form data item corresponding to the flow information of the item is determined; and finally, the source tracing code of the item, the form data item corresponding to the flow information of the item, and the flow information of the item are stored according to the corresponding relationship between the source tracing code of the item, the form data item corresponding to the flow information of the item, and the flow information of the item. The flow information of the item is stored so that the user may monitor the flow process of the item by inquiring the flow information of the stored item, thereby helping to avoid the inflow of counterfeit and inferior items during the flow process of the item.

Figure 3:
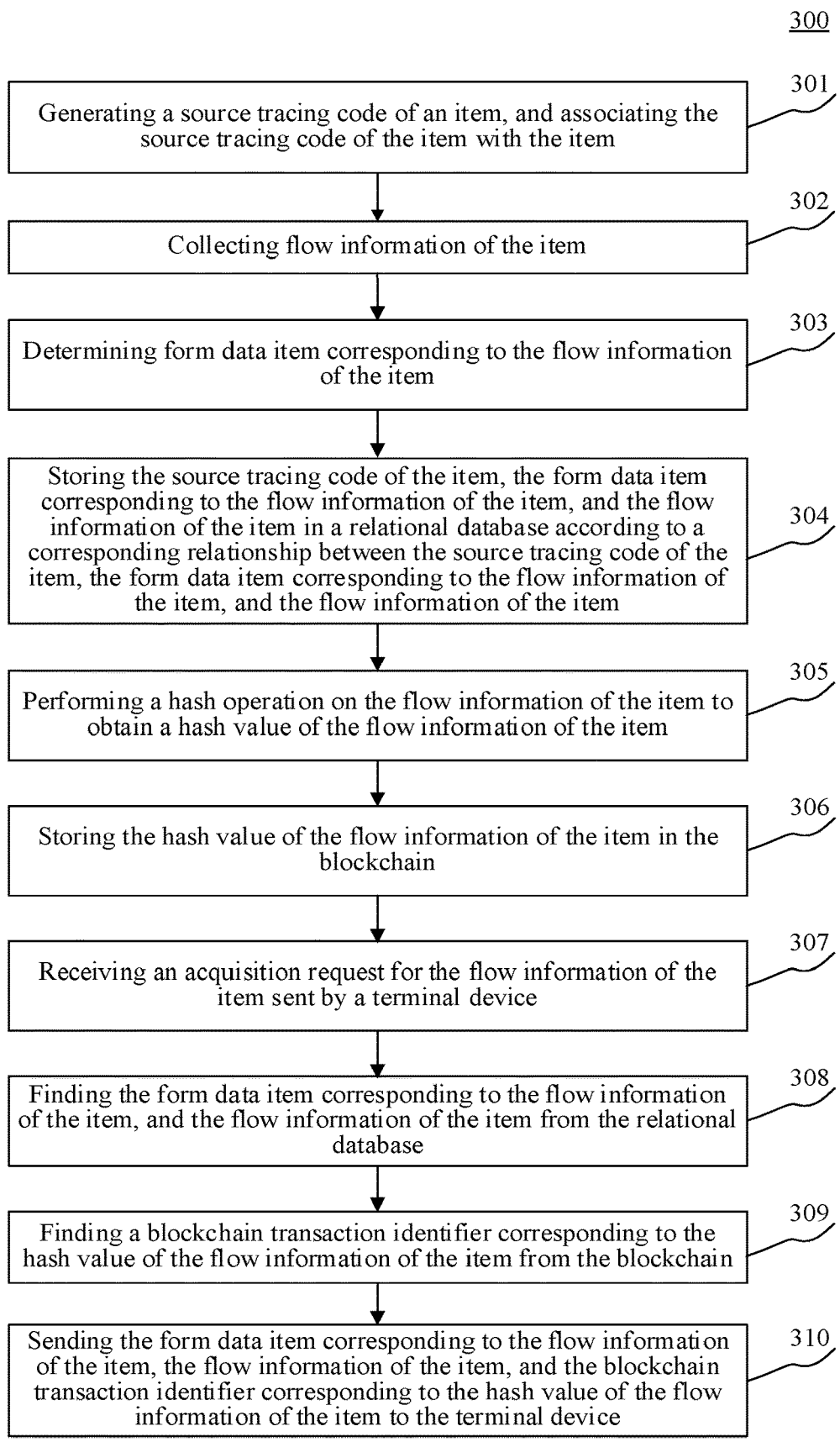
FIG. 3 is a flowchart of a method for storing information according to another embodiment of present disclosure.

Referring further to FIG. 3, there is shown a flow 300 of a method for storing information according to another embodiment of the present disclosure. The flow 300 of the method for storing information includes the following steps.

Step 301, generating a source tracing code of an item, and associating the source tracing code of the item with the item.

In the present embodiment, an electronic device (such as the server 101 shown in FIG. 1) on which a method for storing information runs may generate a source tracing code of an item and associate the source tracing code of the item with the item. The electronic device may be a server of the seller of the item. The items may be various items sold through a shopping website. The source tracing code, also known as the anti-counterfeiting source tracing code, is an information tracing identifier that can be used to uniquely identify an item or a batch of items. Here, a label (for example, a two-dimensional code, a bar code, a text, a picture, or the like) carrying a source tracing code of an item can be printed and attached to the item or a package of the item. At the same time, since there is a correlation between the source tracing code of the item and the item, the item will contain the source tracing code of the item in any information generated in the flow process.

Step 302, collecting flow information of the item.

In this embodiment, the electronic device may collect the flow information of the item. The flow information of the item may include, but is not limited to, at least one of: production information of the item, purchasing information of the item, producer shipment information of the item, warehousing information of the item, order placing information of the item, packing information of the item, logistics information of the item, or sign-in information of the item. Moreover, since there is an association between the source tracing code of the item and the item, any piece of the flow information of the item contains the source tracing code of the item.

Step 303: determining form data item corresponding to the flow information of the item.

In the present embodiment, a person skilled in the art may pre-set a form data item corresponding to various flow information of an item (for example, a form data item corresponding to production information of an item, a form data item corresponding to purchasing information of an item, a form data item corresponding to warehousing information of an item, or the like), and pre-store the form data item in an electronic device, and the electronic device may determine the form data item corresponding to the flow information of the item according to the type of the flow information of the currently collected item.

Step 304: storing the source tracing code of the item, the form data item corresponding to the flow information of the item, and the flow information of the item in a relational database according to a corresponding relationship between the source tracing code of the item, the form data item corresponding to the flow information of the item, and the flow information of the item.

In the present embodiment, the electronic device may first determine the corresponding relationship between the source tracing code of the item, the form data item corresponding to the flow information of the item, and the flow information of the item, for example, there is corresponding relationship between the source tracing code of the item, the form data item corresponding to the production information of the item, and the production information of the item, and there is corresponding relationship between the source tracing code of the item, the form data item corresponding to the purchasing information of the item, and the purchasing information of the item; Then, the source tracing code of the item, the form data item corresponding to the flow information of the item, and the flow information of the item are stored in the relational database according to the corresponding relationship between the source tracing code of the item, the form data item corresponding to the flow information of the item, and the flow information of the item. For example, the source tracing code of the item, the form data item corresponding to the production information of the item, and the production information of the item which have a corresponding relationship therein are stored in the same row of the relational database, and the source tracing code of the item, the form data item corresponding to the purchasing information of the item, and the purchasing information of the item which have a corresponding relationship therein are stored in the next row of the relational database. The relational database is a database based on a relational model, and processes data in the database by means of mathematical concepts and methods such as set algebra. Various entities in the real world and various relationships between entities are represented by relational models. The relational model consists of three parts: relational data structure, relational operation set and relational integrity constraint. Briefly, a relational database is a database composed of a plurality of two-dimensional row and column tables that can be connected to each other.

Step 305, performing a hash operation on the flow information of the item to obtain a hash value of the flow information of the item.

In the present embodiment, the electronic device may perform a hash operation on the flow information of the item, thereby obtaining a hash value of the flow information of the item. Here, the hash operation maps a binary value of an arbitrary length to a smaller binary value of a fixed length, and the smaller binary value is called a hash value. A hash value is a unique and extremely compact numerical representation of a segment of data. If a piece of plaintext is hashed and even one letter of the paragraph is changed, a subsequent hash will produce a different value. To find two different inputs of a hash column of the same value, it is essentially computationally impossible.

Step 306, storing the hash value of the flow information of the item in the blockchain.

In the present embodiment, the electronic device may store a hash value of the flow information of the item in the blockchain. For example, the hash value of the production information of the item is stored in one block of the blockchain, and the purchasing information of the item is stored in the next block of the blockchain. The blockchain is a new application mode of computer technologies such as distributed data storage, point-to-point transmission, consensus mechanism, and encryption algorithm. In a narrow sense, a blockchain is a chained data structure in which data blocks are sequentially combined in chronological order, and tamper-proof and unforgeable distributed account book guaranteed by cryptography. When the hash value of the flow information of the item is stored in the blockchain, a corresponding blockchain transaction identifier is correspondingly generated.

In some alternative implementations of the present embodiment, the electronic device may also store the hash value of the flow information of the item in a chain block of the third-party platform to enable supervision of the flow process of the item by the third-party platform, further contributing to avoiding inflow of counterfeit and inferior items during the flow process of the item.

Step 307: receiving an acquisition request for the flow information of the item sent by a terminal device.

In the present embodiment, the electronic device may receive an acquisition request for the flow information of the item sent by a terminal device. Here, the terminal device may send an acquisition request by scanning a label carrying a source tracing code of an item. Specifically, when a user scans, using the terminal device, a label carrying a source tracing code of an item attached on the item or a packing box of the item, the terminal device can read the source tracing code of the item while transmitting an acquisition request for flow information of the item to the electronic device. The acquisition request may include a source tracing code of the item.

Step 308, finding the form data item corresponding to the flow information of the item, and the flow information of the item from the relational database.

In the present embodiment, in the case where the acquisition request for the flow information of the item is received, the electronic device may find the form data item corresponding to the flow information of the item and the flow information of the item from the relational database. Specifically, the electronic device may match the source tracing code of the item included in the acquisition request with the source tracing code stored in the relational database one by one. If one of the source tracing codes in the relational database is the same as the source tracing code of the item included in the acquisition request, the matching is successful. The form data item corresponding to the successfully matched source tracing code is the form data item corresponding to the flow information of the item. The flow information corresponding to the successfully matched source tracing code is the flow information of the item.

Step 309: finding a blockchain transaction identifier corresponding to the hash value of the flow information of the item from the blockchain.

In the present embodiment, in the case where the acquisition request for the flow information of the item is received, the electronic device may find the blockchain transaction identifier corresponding to the hash value of the flow information of the item from the blockchain. Here, when the hash value of the flow information of the item is stored in the blockchain, a blockchain transaction identifier is correspondingly generated.

Step 310, sending the form data item corresponding to the flow information of the item, the flow information of the item, and the blockchain transaction identifier corresponding to the hash value of the flow information of the item to the terminal device.

In this embodiment, the electronic device may send the found form data item corresponding to the flow information of the item, the flow information of the item, and the blockchain transaction identifier corresponding to the hash value of the flow information of the item to the terminal device, so that the terminal device correspondingly displays the form data item corresponding to the flow information of the item, the flow information of the item, and the blockchain transaction identifier corresponding to the hash value of the flow information of the item.

As can be seen from FIG. 3, the flow 300 of the method for storing information in the present embodiment highlights an information storage step while adding an information query step as compared to the corresponding embodiment of FIG. 2. Therefore, in the solution described in the present embodiment, the flow information of the item is converted into the corresponding hash value and is stored in the blockchain, so that the flow information of the item is not tampered with or forged. At the same time, the user may query the information storage situation in the relational database and the blockchain at any time, so that supervision over the flow process of the item is realized, and further help to avoid the inflow of counterfeit and inferior items during the flow process of the item.

Figure 4:
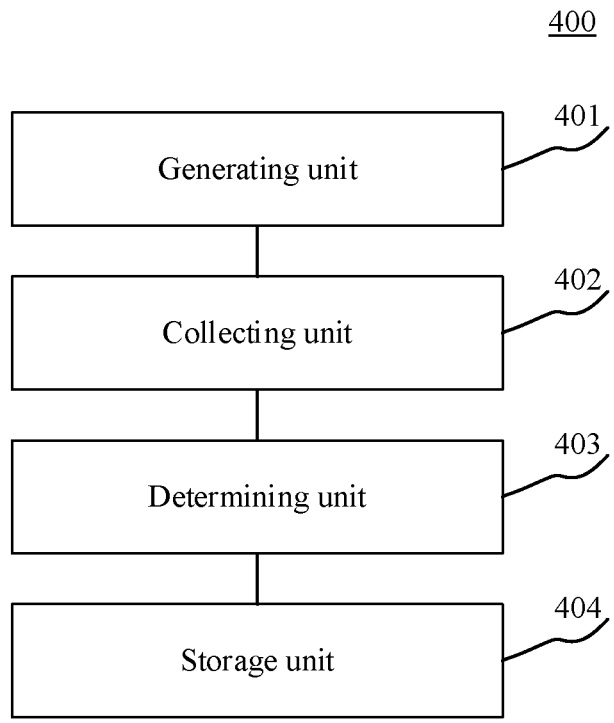
FIG. 4 is a schematic structural diagram of an apparatus for storing information according to an embodiment of present disclosure.

With further reference to FIG. 4, as an implementation of the method shown in each of the above figures, an embodiment of the present disclosure provides an apparatus for storing information, which corresponds to the method embodiment shown in FIG. 2. The apparatus is particularly applicable to various electronic devices.

As shown in FIG. 4, the apparatus 400 for storing information in the present embodiment may include a generating unit 401, a collecting unit 402, a determining unit 403, and a storage unit 404. The generating unit 401 is configured to generate a source tracing code of an item, and associate the source tracing code of the item with the item; The collecting unit 402 is configured to collect flow information of the item. The determining unit 403 is configured to determine a form data item corresponding to the flow information of the item. The storage unit 404 is configured to store the source tracing code of the item, the form data item corresponding to the flow information of the item, and the flow information of the item according to a corresponding relationship between the source tracing code of the item, the form data item corresponding to the flow information of the item, and the flow information of the item.

In the present embodiment, the specific processing of the generating unit 401, the collecting unit 402, the determining unit 403, and the storage unit 404, and the technical effects thereof, in the apparatus 400 for storing information, may be described with reference to step 201, step 202, step 203, and step 204 in the corresponding embodiment of FIG. 2, respectively, and details are not repeated herein.

In some alternative implementations of the present embodiment, the generating unit 401 may include an acquiring module (not shown in the figure) configured to acquire a producer identification code of a producer of the item; a generating module (not shown in the figure) configured to generate an item identification code of the item; and a combination module (not shown in the figure) configured to combine the producer identification code of the producer of the item with the item identification code of the item to obtain the source tracing code of the item.

In some alternative implementations of the present embodiment, the flow information may include, but is not limited to, at least one of: production information of the item, purchasing information of an item, producer shipment information of the item, warehousing information of the item, order placing information of the item, packing information of the item, logistics information of an item, or sign-in information of the item.

In some alternative implementations of the present embodiment, the collecting unit 402 may include: a first collecting module (not shown in the figure) configured to collect the production information of the item by electronic data interchange; a second acquiring module (not shown in the figure) configured to collect the producer shipping information of the item by inter-process communication; a third collecting module (not shown in the figure) configured to collect the purchasing information, warehousing information, order placing information, packaging information, and sign-in information of the item by using a message queue message subscription; and a fourth collecting module (not shown in the figure) configured to collect the logistics information of the item using an application programming interface docking mode.

In some alternative implementations of the present embodiment, the storage unit 404 may include a first storage module (not shown in the figure) configured to store the source tracing code of the item, the form data item corresponding to the flow information of the item, and the flow information of the item in a relational database according to the corresponding relationship between the source tracing code of the item, the form data item corresponding to the flow information of the item, and the flow information of the item; a hash operation module (not shown in the figure) configured to perform a hash operation on the flow information of the item to obtain a hash value of the flow information of the item; and a second storage module (not shown in the figure) configured to store the hash value of the flow information of the item in the blockchain.

In some alternative implementations of the present embodiment, the apparatus 400 for storing information may further include a receiving unit (not shown in the figure) configured to receive an acquisition request for flow information of the item sent by a terminal device, wherein the terminal device transmits the acquisition request by scanning a label carrying a source tracing code of the item; a first searching unit (not shown in the figure) configured to find the form data item corresponding to the flow information of the item and the flow information of the item from the relational database; a second searching unit (not shown in the figure) configured to find a blockchain transaction identifier corresponding to the hash value of the flow information of the item from the blockchain; a sending unit (not shown in the figure) configured to send the form data item corresponding to the flow information of the item, the flow information of the item, and the blockchain transaction identifier corresponding to the hash value of the flow information of the item to the terminal device, so that the terminal device displays the form data item corresponding to the flow information of the item, the flow information of the item, and the blockchain transaction identifier corresponding to the hash value of the flow information of the item.

Figure 5:
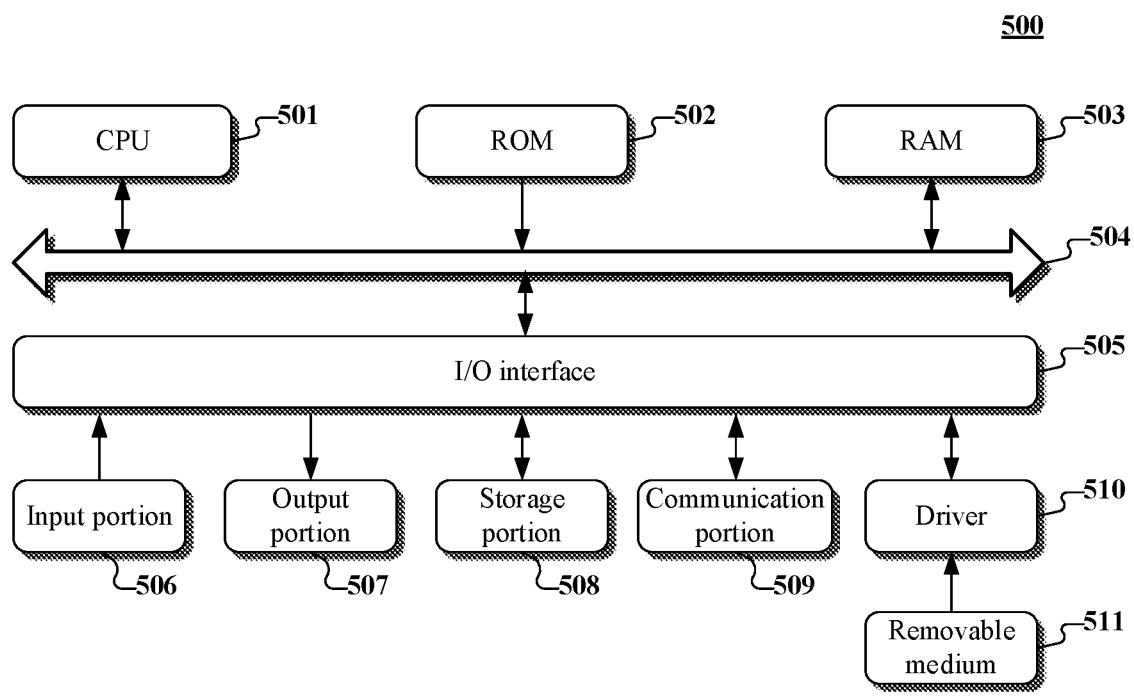
FIG. 5 is a schematic structural diagram of a computer system suitable for implementing an electronic device of embodiments of the present disclosure.

Referring now to FIG. 5, there is shown a schematic structural diagram of a computer system 500 suitable for implementing an electronic device of an embodiment of the present disclosure. The electronic device shown in FIG. 5 is merely an example and should not impose any limitations on the functionality and scope of use of the embodiment of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 701, the ROM 502 and the RAM 503 are connected to each other through a bus 504. An input/output (I/O) interface 505 is also connected to the bus 504.

The following components are connected to the I/O interface 505: an input portion 506 including, for example, a keyboard, and a mouse; an output portion 507 including, for example, a cathode-ray tube (CRT) and a liquid crystal display (LCD), and a speaker; a storage portion 508 including, for example, a hard disk; and a communication portion 509 including a network interface card such as a LAN card, a modem, or the like. The communication portion 509 performs communication processing via a network such as the Internet. The driver 510 is also connected to the I/O interface 505 as needed. A removable medium 511, such as a magnetic disk, an optical disk, a magneto-optical disk, a semiconductor memory, or the like, is installed on the drive 510 as necessary, so that a computer program read out therefrom is installed on the storage portion 508 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a machine-readable medium. The computer program includes program codes for executing the method as illustrated in the flow chart. In such an embodiment, the computer program may be downloaded and installed from a network via the communication portion 509, and/or may be installed from the removable medium 511. The computer program, when executed by the central processing unit (CPU) 501, implements the functions as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a generating unit, a collecting unit, a determining unit, and a storage unit. Here, the names of these units do not in some cases constitute a limitation to such units themselves. For example, the generating unit may also be described as "a unit configured to generate a source tracing code of an item, and associate the source tracing code of the item with the item."

In another aspect, an embodiment of the present disclosure further provides a computer-readable medium. The computer-readable medium may be included in the electronic device in the above described embodiments, or a stand-alone computer-readable medium not assembled into the electronic device. The computer-readable medium stores one or more programs. The one or more programs, when executed by the electronic device, cause the electronic device to: generate a source tracing code of an item, and associate the source tracing code of the item with the item; collect flow information of the item; determine a form data item corresponding to the flow information of the item; and store the source tracing code of the item, the form data item corresponding to the flow information of the item, and the flow information of the item according to a corresponding relationship between the source tracing code of the item, the form data item corresponding to the flow information of the item, and the flow information of the item.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

The invention claimed is:

1. A computer-implemented method for storing information, comprising:
   generating a source tracing code of an item, and associating the source tracing code of the item with the item;
   collecting flow information of the item;
   determining a form data item corresponding to the flow information of the item;
   storing the source tracing code of the item, the form data item corresponding to the flow information of the item, and the flow information of the item in a relational database according to a corresponding relationship between the source tracing code of the item, the form data item corresponding to the flow information of the item, and the flow information of the item;
   performing a hash operation on the flow information of the item to obtain a hash value of the flow information of the item;
   storing the hash value of the flow information of the item in a blockchain;
   receiving an acquisition request for the flow information of the item sent by a terminal device, wherein the terminal device transmits the acquisition request by scanning a label carrying the source tracing code of the item;
   finding the form data item corresponding to the flow information of the item and the flow information of the item from the relational database;
   finding a blockchain transaction identifier corresponding to the hash value of the flow information of the item from the blockchain; and
   sending the form data item corresponding to the flow information of the item, the flow information of the item, and the blockchain transaction identifier corresponding to the hash value of the flow information of the item to the terminal device, so that the terminal device displays the form data item corresponding to the flow information of the item, the flow information of the item, and the blockchain transaction identifier corresponding to the hash value of the flow information of the item.

2. The method of claim 1, wherein the generating a source tracing code of an item comprises:
   acquiring a producer identification code of a producer of the item;
   generating an item identification code of the item; and
   combining the producer identification code of the producer of the item with the item identification code of the item to obtain the source tracing code of the item.

3. The method of claim 1, wherein the flow information comprises at least one of: production information of the item, purchasing information of the item, producer shipment information of the item, warehousing information of the item, order placing information of the item, packing information of the item, logistics information of the item, or sign-in information of the item.

4. The method of claim 3, wherein the collecting flow information of the item comprises:
   collecting the production information of the item by electronic data interchange;
   collecting the producer shipment information of the item by inter-process communication;
   collecting the purchasing information, the warehousing information, the order placing information, the packing information and the sign-in information of the item by using a message queue message subscription method; and
   collecting the logistics information of the item by utilizing an application programming interface docking mode.

5. An apparatus for storing information, comprising:
   at least one processor; and
   a memory storing instructions, wherein the instructions when executed by the at least one processor, cause the at least one processor to perform operations, the operations comprising:
   generating a source tracing code of an item, and associate the source tracing code of the item with the item;
   collecting flow information of the item;
   determining a form data item corresponding to the flow information of the item;
   storing the source tracing code of the item, the form data item corresponding to the flow information of the item, and the flow information of the item in a relational database according to a corresponding relationship between the source tracing code of the item, the form data item corresponding to the flow information of the item, and the flow information of the item;
   performing a hash operation on the flow information of the item to obtain a hash value of the flow information of the item;
   storing the hash value of the flow information of the item in a blockchain;
   receiving an acquisition request for the flow information of the item sent by a terminal device, wherein the terminal device transmits the acquisition request by scanning a label carrying the source tracing code of the item;
   finding the form data item corresponding to the flow information of the item and the flow information of the item from the relational database;
   finding a blockchain transaction identifier corresponding to the hash value of the flow information of the item from the blockchain; and
   sending the form data item corresponding to the flow information of the item, the flow information of the item, and the blockchain transaction identifier corresponding to the hash value of the flow information of the item to the terminal device, so that the terminal device displays the form data item corresponding to the flow information of the item, the flow information of the item, and the blockchain transaction identifier corresponding to the hash value of the flow information of the item.

6. The apparatus of claim 5, wherein the generating a source tracing code of an item comprises:
acquiring a producer identification code of a producer of the item;
generating an item identification code of the item; and
combining the producer identification code of the producer of the item with the item identification code of the item to obtain the source tracing code of the item.

7. The apparatus of claim 5, wherein the flow information comprises at least one of: production information of the item, purchasing information of the item, producer shipment information of the item, warehousing information of the item, order placing information of the item, packing information of the item, logistics information of the item, or sign-in information of the item.

8. The apparatus of claim 7, wherein the collecting flow information of the item comprises:
collecting the production information of the item by electronic data interchange;
collecting the producer shipment information of the item by inter-process communication;
collecting the purchasing information, the warehousing information, the order placing information, the packing information and the sign-in information of the item by using a message queue message subscription method; and
collecting the logistics information of the item by utilizing an application programming interface docking mode.

9. A non-transitory computer readable storage medium, storing a computer program thereon, wherein the computer program, when executed by a processor, causes the processor to perform operations, the operations comprising:
generating a source tracing code of an item, and associate the source tracing code of the item with the item;
collecting flow information of the item;
determining a form data item corresponding to the flow information of the item; and
storing the source tracing code of the item, the form data item corresponding to the flow information of the item, and the flow information of the item in a relational database according to a corresponding relationship between the source tracing code of the item, the form data item corresponding to the flow information of the item, and the flow information of the item;
performing a hash operation on the flow information of the item to obtain a hash value of the flow information of the item;
storing the hash value of the flow information of the item in a blockchain;
receiving an acquisition request for the flow information of the item sent by a terminal device, wherein the terminal device transmits the acquisition request by scanning a label carrying the source tracing code of the item;
finding the form data item corresponding to the flow information of the item and the flow information of the item from the relational database;
finding a blockchain transaction identifier corresponding to the hash value of the flow information of the item from the blockchain; and
sending the form data item corresponding to the flow information of the item, the flow information of the item, and the blockchain transaction identifier corresponding to the hash value of the flow information of the item to the terminal device, so that the terminal device displays the form data item corresponding to the flow information of the item, the flow information of the item, and the blockchain transaction identifier corresponding to the hash value of the flow information of the item.

10. The non-transitory computer readable storage medium of claim 9, wherein the generating a source tracing code of an item comprises:
acquiring a producer identification code of a producer of the item;
generating an item identification code of the item; and
combining the producer identification code of the producer of the item with the item identification code of the item to obtain the source tracing code of the item.

11. The non-transitory computer readable storage medium of claim 9, wherein the flow information comprises at least one of:
production information of the item, purchasing information of the item, producer shipment information of the item, warehousing information of the item, order placing information of the item, packing information of the item, logistics information of the item, or sign-in information of the item.

12. The non-transitory computer readable storage medium of claim 11, wherein the collecting flow information of the item comprises:
collecting the production information of the item by electronic data interchange;
collecting the producer shipment information of the item by inter-process communication;
collecting the purchasing information, the warehousing information, the order placing information, the packing information and the sign-in information of the item by using a message queue message subscription method; and
collecting the logistics information of the item by utilizing an application programming interface docking mode.

* * * * *